United States Patent
Landrum et al.

(10) Patent No.: US 7,314,503 B2
(45) Date of Patent: Jan. 1, 2008

(54) PROCESS TO REMOVE NITROGEN AND/OR CARBON DIOXIDE FROM METHANE-CONTAINING STREAMS

(75) Inventors: J. Mark Landrum, Collinsville, OK (US); Branch J. Russell, Houston, TX (US); Kenneth Agee, Bixby, OK (US); Stephen LeViness, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 258 days.

(21) Appl. No.: 11/004,304

(22) Filed: Dec. 3, 2004

(65) Prior Publication Data

US 2005/0139072 A1 Jun. 30, 2005

Related U.S. Application Data

(60) Provisional application No. 60/527,743, filed on Dec. 8, 2003.

(51) Int. Cl.
*B01D 53/047* (2006.01)
*B01D 53/22* (2006.01)

(52) U.S. Cl. .................. 95/50; 95/51; 95/96; 95/130; 95/139

(58) Field of Classification Search ............. 95/45, 95/50, 51, 96, 130, 139, 232, 236, 902; 96/9, 96/134; 423/228, 229; 62/611; 502/64, 502/68
See application file for complete search history.

(56) References Cited

U.S. PATENT DOCUMENTS

| | | | |
|---|---|---|---|
| 2,860,030 A | 11/1958 | Goldtrap et al. | |
| 4,152,217 A | 5/1979 | Eisenberg et al. | |
| 5,390,499 A | 2/1995 | Rhoades et al. | |
| 5,411,721 A | 5/1995 | Doshi et al. | |
| 5,617,741 A | 4/1997 | McNeil et al. | |
| 5,792,239 A | 8/1998 | Reinhold, III et al. | |
| 5,852,061 A | 12/1998 | Alexion et al. | |
| 5,879,431 A * | 3/1999 | Baker et al. ............. | 95/50 |
| 6,048,472 A | 4/2000 | Nataraj et al. | |
| 6,068,682 A | 5/2000 | Kuznicki et al. | |
| 6,350,371 B1 * | 2/2002 | Lokhandwala et al. ...... | 208/134 |
| 6,425,267 B1 | 7/2002 | Baker et al. | |
| 6,447,578 B1 | 9/2002 | Ciccarelli | |
| 6,565,626 B1 | 5/2003 | Baker et al. | |
| 6,572,678 B1 | 6/2003 | Wijmans et al. | |
| 6,610,124 B1 | 8/2003 | Dolan et al. | |
| 6,630,012 B2 | 10/2003 | Wegeng et al. | |
| 6,631,626 B1 | 10/2003 | Hahn | |
| 7,025,803 B2 * | 4/2006 | Wascheck et al. ......... | 95/50 |

OTHER PUBLICATIONS

S. Tiong Sie, Acid-Catalyzed Cracking or Paraffinic Hydrocarbons, Discussion of Existing Mechanisms and Proposal of a a New Mechanism; American Chemical Society, 1992; vol. 31, No. 8.

* cited by examiner

*Primary Examiner*—Frank M. Lawrence

(57) ABSTRACT

A process for the removal of inert gases, such as nitrogen and carbon dioxide, from methane-containing gases, such as natural gas, including a first stage removal which lowers the total combined inert content to about less than 30% and a second stage removal utilizing a pressure swing adsorption process comprising one or more adsorbent beds comprising contracted titanosilicate-1 adsorbent, wherein the purified methane-containing gas contains less than about 6% total combined inerts.

23 Claims, 1 Drawing Sheet

PROCESS TO REMOVE NITROGEN AND/OR CARBON DIOXIDE FROM METHANE-CONTAINING STREAMS

CROSS REFERENCE TO RELATED APPLICATIONS

This application claims priority to U.S. provisional application Ser. No. 60/527,743, entitled "Process to Remove Nitrogen and/or Carbon Dioxide from Methane-Containing Streams," by Landrum et al, filed on Dec. 8, 2003, the disclosure of which is incorporated herein.

FEDERALLY SPONSORED RESEARCH

Not applicable.

REFERENCE TO MICROFICHE APPENDIX

Not applicable.

FIELD OF THE INVENTION

The invention relates to the treatment and upgrading of nitrogen-rich and/or carbon dioxide-rich natural gas or other methane-containing streams. More particularly, the invention relates to staged removal of the nitrogen and/or carbon dioxide impurities including the use of a pressure swing adsorption unit.

BACKGROUND OF THE INVENTION

Many of the world's remaining natural gas reserves contain relatively high values of inerts, such as nitrogen gas and carbon dioxide. The presence of such inerts lowers the BTU value of the natural gas making it unsuitable as pipeline quality gas. In addition, the presence of both water and carbon dioxide may make the natural gas corrosive. In order to meet specifications for use, such as pipeline quality specifications, such inerts must be wholly or substantially removed. Typical pipeline quality specifications mandate a total combined nitrogen and carbon dioxide content of less than about 6%.

Moreover, the process for removing inerts must be sufficiently economical so as to compete with other energy sources. Indeed, because natural gas is treated in very large quantities, small differences in process economics, i.e. capital and operating costs, of purification processes can determine whether the purified natural gas product is economically competitive.

In addition to these considerations, the safety of a purification process must be considered as natural gas is potentially explosive. Consequently, processes which are highly reliable and simple to operate are preferred.

SUMMARY OF THE INVENTION

The invention is a process for treating and upgrading natural gas having excess nitrogen or carbon dioxide ("low BTU natural gas"), thereby producing a marketable product stream of higher value, i.e., pipeline quality sales gas. The process of the invention optionally produces one or two additional streams having value as low heating value fuel gas suitable for burning in combustion turbines or natural gas engines. The process is a hybrid system wherein low BTU natural gas, or other methane-containing gas, is first treated to lower the total inert concentration to about 30% or less. Thereafter, the natural gas, or other methane-containing gas, is treated with a swing adsorption process utilizing a contracted titanosilicate-1 adsorbent to produce a gas containing less than about 6% inerts.

In some embodiments of the inventive process, membrane and non-membrane gas separation units are integrated in the same processing facility for the purpose of staged removal of nitrogen and/or carbon dioxide from the raw natural gas stream, thereby yielding a methane-rich, pipeline quality product natural gas. Such an integrated hybrid system may provide a more economic configuration with lower capital and operating costs for a gas treatment facility handling raw produced natural gas streams containing nitrogen or carbon dioxide in concentration greater than about 25% and less than about 65%. Moreover, integrated hybrid system may extend the envelope of commercially viable natural gas reserves to high inert-content reserves not currently considered commercially practicable.

Several process schemes can be used, depending on which inert predominates—nitrogen or carbon dioxide, on the pressure of the raw natural gas to be upgraded by the process, and on whether it is desirable to incorporate electric power generation into the gas treatment plant operations.

DESCRIPTION OF EMBODIMENTS OF THE INVENTION

Figure 1:
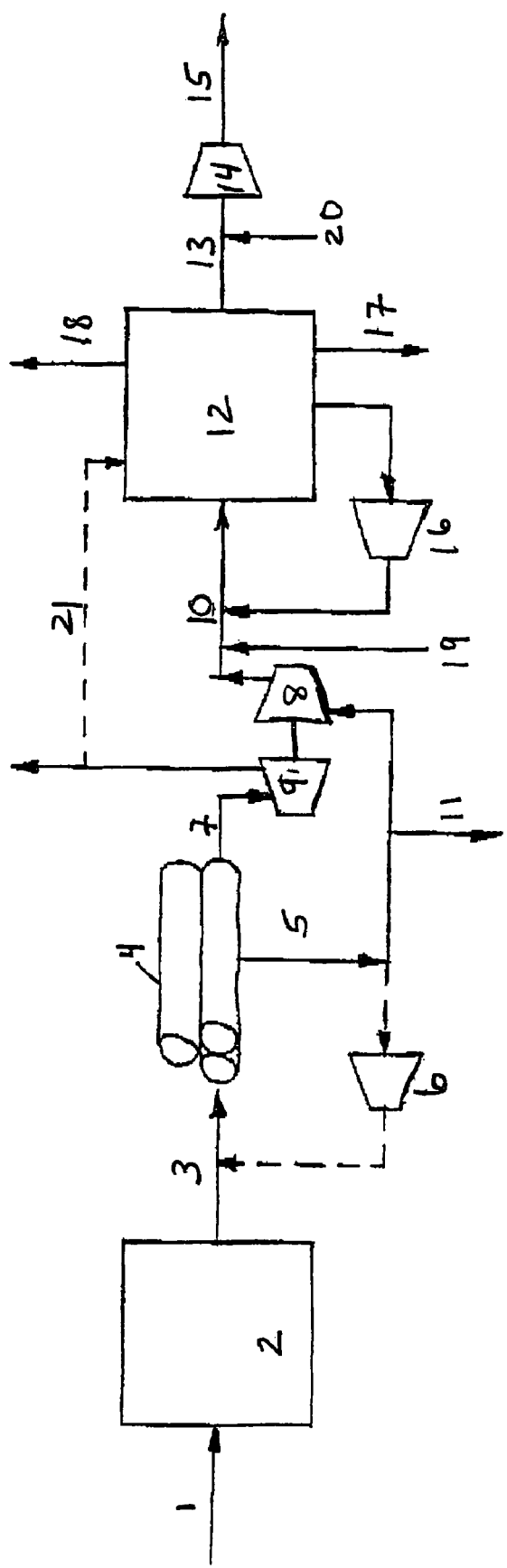
FIG. 1 is a schematic diagram of one embodiment of the process of the invention.

The terms "inerts," and "inert compounds" are used interchangeably herein and mean nitrogen gas and carbon dioxide.

The term "low BTU natural gas" means natural gas containing up to about 40% to 70% inerts.

Unless otherwise stated, all percentages herein are by volume.

The inert removal process of the invention includes a hybrid system comprising a first stage removal process and a second stage removal process which utilizes pressure swing adsorption. The process provides staged removal of the inert compounds yielding a methane rich stream. The first stage of the inert removal process may be any process or combination of processes which results in a stream containing less than or equal to about 30% combined total inerts. Processes useful in the first stage include, for example, selective membrane filtration, cryogenic distillation, and amine scrubbing.

Selective membranes useful in the present invention include, for example, carbon dioxide selective membranes and nitrogen selective membranes. Selective membranes suitable for use in the invention are capable of selectively permeating a component, such as carbon dioxide, generally at relatively high pressures, while excluding other gas components, such as methane. In the case of nitrogen selective membranes, the permeate stream is generally methane while the nitrogen gas does not pass through the membrane.

A number of carbon dioxide selective membranes are currently available and include those made by UOP. Examples of carbon dioxide selective membranes useful in the invention as well as appropriate operating conditions and parameters are described in U.S. Pat. No. 5,411,721, which is incorporated herein by reference.

Suitable nitrogen selective membranes are currently available and include those made by Membrane Technology and Research. Examples of nitrogen selective membranes useful in the invention as well as appropriate operating conditions and parameters are described in U.S. Pat. No. 6,425,267, which is incorporated herein by reference.

When the first stage of the process utilizes selective membrane(s), one or more membranes operating in one or more membrane units may be used. Depending upon the membrane used, either methane or the inert may be the permeate stream.

Whereas selective membranes and cryogenic distillation are useful in removing all inerts, amine scrubbing removes solely carbon dioxide and other acid gases, such as hydrogen sulfide. Amine scrubbing processes are well known and have been used for several years to remove acid gases from petroleum and natural gas streams. Such processes utilize an alkaline solvent which is contacted with a stream containing acid gases. Alkanolamines are one class of very common alkaline solvent used to remove carbon dioxide and other acid gases from methane containing gases. One method of scrubbing acid gases from hydrocarbon streams is disclosed in U.S. Pat. No. 2,860,030, which is incorporated herein by reference.

The second stage of inert removal, or the polishing stage, utilizes pressure and/or thermal swing adsorption ("swing adsorption"). The swing adsorption step of the process is accomplished using a selective adsorbent which provides at least about 75% methane recovery. The adsorbent may be mixed with one or more materials selected from clays, silicas, and metal oxides. In a preferred embodiment, the adsorbent is a crystalline titanium silicate adsorbent referred to as contracted, or crystalline, titanosilicate-1 or CTS-1, produced by Engelhard Corporation and discussed in detail in U.S. Pat. No. 6,068,682 (the '682 patent), the disclosure of which is incorporated herein in its entirety. Appropriate operating and regenerating conditions and parameters are also disclosed in the '682 patent. U.S. Pat. No. 6,068,682 is incorporated herein by reference. As described in the '682 patent, the CTS-1 sieves are very effective in separating nitrogen and acid gases selectively from methane because the pore size of the CTS-1 may be closely controlled to a size effective in adsorbing such inerts while excluding the larger methane molecules. Any titanosilicate sieve which preferentially and selectively adsorbs nitrogen and/or carbon dioxide, while rejecting compounds containing carbon-hydrogen bonds, may be used in the process. The feed to the pressure swing adsorbent is generally between about 100 and about 800 psig.

Swing adsorption is generally accomplished using a multiple bed configuration so that at least one bed is available for use in the process while the remaining beds are being depressurized and/or thermally regenerated, thereby desorbing the adsorbed inerts. The number and size of adsorbent beds will vary depending upon the desired production rate and concentration of inerts in the gas fed to the adsorption beds. The adsorbent used in the adsorbent bed(s) may be mixed with one or more materials selected from clays, silicas, and metal oxides.

With reference to FIG. 1, one embodiment of the process of the invention is described. A raw feed gas 1 is fed into a feed gas compressor 2. The raw feed gas 1 may be compressed to a pressure between about 400 psia and about 1,000 psia to form a compressed feed gas 3. The compressed feed gas 3 is fed into a first stage membrane unit 4 containing a nitrogen selective membrane for which the permeate stream is methane. The compressed feed gas 3 may be fed into the first stage membrane unit 4 at a temperature greater than about 40° C. A membrane permeate stream 5 may be recycled into the compressed feed gas stream 3 following recompression by a membrane permeate compressor 6. The non-permeate stream, which is still under pressure and primarily contains nitrogen gas, may be used to produce energy in a turbo expander 9. Following expansion in turbo expander 9, the nitrogen gas may be vented or, alternatively used as a purge gas, as discussed below.

One or more membrane separation steps may be used in the invention. In one embodiment of the invention, for example, a natural gas containing about 45% nitrogen at a pressure between about 550 and 700 psia may be fed into a first membrane separation unit. A first permeate stream is recovered at a pressure of between about 50 and about 275 psia. In some embodiments, the first permeate stream may be recovered at a pressure of between about 25 psia and about 300 psia. The non-permeate stream may then be passed into a second membrane separation unit. A second permeate stream is collected and may then be recompressed and re-fed into the first membrane separation unit. The pressure of the second permeate stream may be greater than about 25 psia. Alternatively, the second permeate could be fed to the suction of a feed compressor. The non-permeate stream from the second membrane separation unit may have about 85% to about 90% methane recovery and a pressure of about 50 psia. That is, the methane loss in a two membrane, first stage membrane removal step may be up to about 15%.

The energy produced in turbo expander 9 may then be used to power a second stage feed gas booster compressor 8. All or part of membrane permeate stream 5 may be recovered as a low BTU value combustion turbine fuel 11. Alternatively, all or part of membrane permeate stream 5 may be re-pressurized in second stage feed gas booster compressor 8. The re-pressurized membrane permeate stream is then fed into the second stage swing adsorption unit 12 wherein a nitrogen and/or carbon dioxide selective adsorbent is used. As discussed supra, swing adsorption units generally consist of several adsorbent beds so that at least one bed is operational removing inerts at all times. Although several adsorbent beds are preferred for operating efficiency, it is not necessary to have several beds and the present invention is intended to include processes having one or more adsorbent beds in the swing adsorption unit 12. Methane loss through the swing adsorption unit may be up to about 25%.

Associated or non-associated gas 19 may be added to the second stage feed gas 10 to provide a blended gas. A product gas 13 is recovered from the swing adsorption unit 12. Product gas 13 may be re-pressurized by a sales gas compressor 14 prior to injection into sales gas pipeline 15. Again, associated or non-associated gas 20 may be added to the product gas 13 to provide a blended gas. Generally, such addition occurs before re-pressurization.

A tail gas 18 may be removed from swing adsorption unit 12. A low BTU fuel 17, having undergone insufficient scrubbing by the adsorbent, may also be removed from swing adsorption unit 12. Such low BTU value fuel may used, for example, as a gas engine fuel. Alternatively, the low value BTU fuel 17 may be recompressed by a second stage recycle compressor 16 and then fed into the second stage feed gas stream 10.

The inert-rich stream obtained from the membrane separation step may be used to purge the adsorbent beds not in use in a multiple bed swing adsorption unit. In the instant example, non-permeate stream 7 is composed primarily of nitrogen and may be used to purge a selective swing adsorbent.

In the event the permeate gas stream is the inert, as is typical with carbon dioxide selective membranes, the process would have to be reconfigured from that described above with reference to FIG. 1. In particular, in such case, the permeate stream, i.e. the inert-rich stream, may be fed to a turbo expander, vented, or used as a purge gas. Likewise, the non-permeate stream in which the inert content has been reduced could be re-pressurized by second stage feed gas booster compressor 8 or could be fed directly to the swing adsorption unit 12.

The process conditions may be customized to produce the quality of gas desired thereby achieving the desired product while maximizing process economics. Alternatively, the process may be operated for maximum removal of some or all of the inert compounds. The process of the invention may include removal of either or both of nitrogen gas and carbon dioxide depending upon the choice of first stage removal process and the type and/or pore size of the CTS-1 molecular sieve chosen for the swing adsorption unit. A single adsorbent may be used to remove both nitrogen and carbon dioxide or separate adsorbents, one or more for nitrogen and one or more for carbon dioxide, may be used in either the same or separate adsorbent beds.

Appropriate feedstocks for the inventive process include natural gas and other streams containing relatively high, greater than about 30%, methane content.

In some embodiments, the inventive process is used in connection with the purification of a methane containing gas entrained in a liquid stream wherein the gas and liquid components are separated prior to introduction of the gas component into the process. For example, a natural gas entrained petroleum stream may be fed to a gas/liquid separator. The headspace of the separator will contain the natural gas stream which may be removed and fed into the inventive process. Similarly, the gaseous product of an incomplete or insufficient cryogenic separation process may be fed into the inventive process to recover methane remaining in the gas stream.

In another embodiment, the inventive process is used in an integrated hydrocarbon production process, such as a Fischer-Tropsch process. For example, such an integrated hydrocarbon production process may be located at or near a natural gas or oil well site wherein the raw produced gas is first treated using the inventive process to remove inerts and to obtain a methane rich gas which is then fed into an autothermal reactor to produce a synthesis gas which may, in turn, be used as feedstock for a Fischer-Tropsch synthesis.

In yet another embodiment, the process of the invention is used to sequester carbon dioxide in petrochemical or other processes in which the carbon dioxide may be otherwise lost, vented or flared. This is particularly advantageous in those processes in which the carbon dioxide is vented. By sequestering the carbon dioxide, such a refinery or process plant may earn carbon credits.

The process of the invention can be further used to remove inerts from other methane-containing streams, such as those which may be encountered in refining operations. For example, natural gas associated with oil production is frequently high in carbon dioxide because this gas is pumped into the well to increase well pressures. Recovery of the carbon dioxide as well as purification of the associated natural gas would be beneficial in such situations and the process of the invention may be useful therefor.

What is claimed is:

1. A process to purify a natural gas stream comprising between about 25% and 60% total inerts, the process comprising the steps of:
   (a) treating the natural gas stream with a first stage process comprising one or more processes of the group of selective membrane filtration, cryogenic distillation and amine scrubbing to produce a semi-purified natural gas stream comprising less than or equal to about 30% total combined inerts; and
   (b) treating the semi-purified natural gas stream with a second stage process in a pressure swing adsorption unit having one or more adsorbent beds having CTS-1 molecular sieve to obtain a product natural gas stream comprising less than about 5% total combined inerts.

2. The process of claim 1 wherein the natural gas stream is a raw produced natural gas.

3. The process of claim 1 wherein the inerts consist essentially of nitrogen and carbon dioxide.

4. The process of claim 1 wherein the first stage process is selective membrane filtration comprising a nitrogen selective membrane.

5. The process of claim 1 wherein the first stage process comprises selective membrane filtration with a carbon dioxide selective membrane.

6. The process of claim 1 wherein the first stage process comprises cryogenic distillation.

7. The process of claim 1 wherein the first stage process comprises an amine scrubbing process.

8. The process of claim 4 wherein methane permeates the nitrogen selective membrane.

9. The process of claim 5 wherein carbon dioxide permeates the carbon dioxide selective membrane.

10. The process of claim 4 or 5 wherein the first stage process comprises more than one membrane connected in series.

11. The process of claim 2 wherein the product gas is a pipeline quality natural gas.

12. The process of claim 1 wherein the second stage is operated at pressures between about 100 and 800 psig.

13. An integrated synthetic hydrocarbon production process comprising the process of claim 1.

14. The method of claim 1 wherein the natural gas stream is natural gas associated with oil production.

15. A process to produce a pipeline quality natural gas comprising the steps of:
   (a) compressing a nitrogen-rich raw natural gas produced at low pressure to a first pressure between about 400 and about 1,000 psia to form a compressed feed gas stream;
   (b) feeding the compressed feed gas stream at a temperature greater than about 40° C. to the feed side of a membrane filtration system wherein the membrane is more permeable to methane than to nitrogen to produce a semi-purified stream;
   (c) recovering from the permeate side of the membrane, at a second pressure lower than the first pressure, a first permeate gas stream comprising less than or equal to about 30% nitrogen;
   (d) recompressing the first permeate gas stream in a second stage feed gas booster compressor to produce a pressure swing adsorption feed gas; and
   (e) recovering from the outlet of the membrane feed side a non-permeate gas stream enriched in nitrogen as compared to the compressed feed gas stream.

16. The process of claim 15 further comprising the steps of:
   (f) feeding the non-permeate gas to the feed side of a second membrane filtration system; and
   (g) recovering from the permeate side of the second membrane filtration system, at a third pressure lower than the first pressure, a second permeate gas stream reduced in nitrogen content compared to the first step membrane non-permeate gas stream.

17. The process of claim 15 wherein the second pressure is between about 25 and about 300 psia.

18. The process of claim 16 wherein the third pressure is greater than about 25 psia.

19. The process of claim 16 further comprising the step of:
(h) recycling the second permeate gas stream to the raw feed gas or the compressed feed gas stream.

20. The process of claim 19 further comprising the step of:
(i) withdrawing the second permeate stream as a fuel stream.

21. The process of claim 1 wherein the natural gas is associated with oil production; wherein the first stage is a carbon dioxide selective membrane filtration; and further comprising the step of recovering the permeate stream which consists essentially of carbon dioxide.

22. The process of claim 1 wherein the adsorbent is mixed with one or more materials selected from the group of clays, silicas, and metal oxides.

23. The process of claim 15 wherein the adsorbent is mixed with one or more materials selected from the group of clays, silicas, and metal oxides.

* * * * *